July 20, 1954  C. M. MILLER  2,684,222
ADJUSTABLE PIPE SUPPORT
Filed May 2, 1952
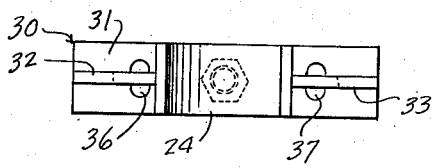
FIG. 1.
FIG. 2.   FIG. 3.   FIG. 4.
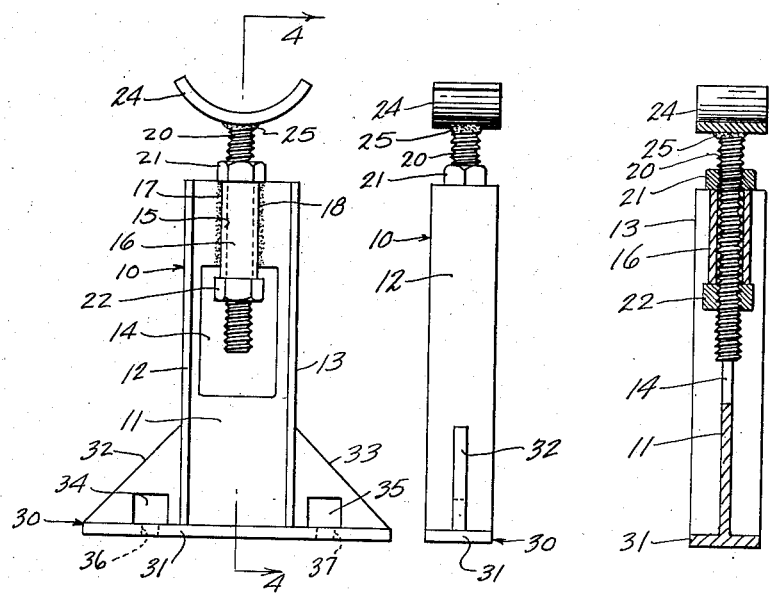
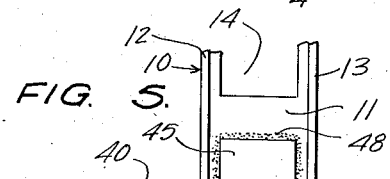
FIG. 5.   FIG. 6.
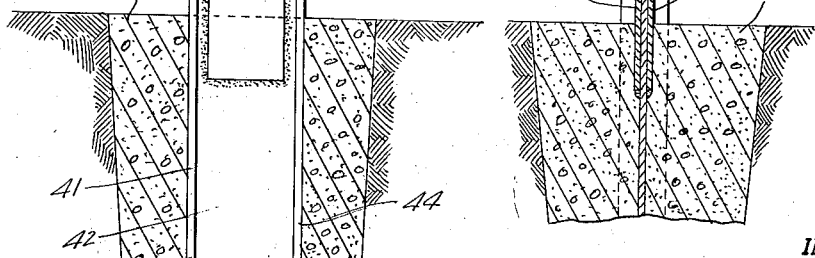
INVENTOR.
CHARLES M. MILLER,
BY
McMorrow, Berman & Davidson
ATTORNEYS.

Patented July 20, 1954

2,684,222

UNITED STATES PATENT OFFICE 2,684,222

ADJUSTABLE PIPE SUPPORT

Charles M. Miller, Shreveport, La.

Application May 2, 1952, Serial No. 285,605

4 Claims. (Cl. 248—49)

This invention relates to pipe supports for supporting pipes or tubes in chemical plants, refineries, cross country gas transmission lines, compressor stations, dehydration stations, gas plants, and other applications, and more particularly to a vertically adjustable pipe support and a supporting base therefor.

It is among the objects of the invention to provide an improved pipe support including a standard and a saddle mounted on the standard and vertically adjustable relative thereto for properly positioning the saddle to support an associated pipe or conduit and for moving the saddle away from the pipe for painting the bearing surface of the saddle and other maintenance; which includes base structures for mounting the supports on building or other structural members or in the ground, as may be necessary; which is formed of standard structural material by simple cutting and welding processes; which will firmly support an associated pipe or conduit in desired position; and which is simple and durable in construction, economical to manufacture, easy to install and maintain, and positive and effective in use.

Other objects and advantages will become apparent from a consideration of the following description and the appended claims in conjunction with the accompanying drawing wherein:

Figure 1 is a top plan view of a pipe support illustrative of the invention;

Figure 2 is a side elevational view of the pipe support;

Figure 3 is an edge elevational view of the pipe support;

Figure 4 is a longitudinal cross sectional view on the line 4—4 of Figure 2;

Figure 5 is a somewhat diagrammatic cross sectional view showing a pipe support base mounted in the ground; and Figure 6 is a fragmentary cross sectional view on the line 6—6 of Figure 5.

With continued reference to the drawing, the numeral 10 generally indicates a standard formed of a suitable length of structural I-beam stock of the proper dimensions and including a web 11 and flanges 12 and 13 extending one along each side edge of the web in spaced apart and parallel relationship to each other and extending symmetrically to opposite sides of the web. The web 11 is provided intermediate the length of the standard with an opening 14 of rectangular shape and with a slot 15 extending medially of the web from the opening 14 to one end of the standard. A length of tubing 16 is disposed in the slot 15 and extends longitudinally of the slot with its center line substantially in the plane of the web 11 of the standard. This tube or sleeve 16 is substantially coterminous with the slot 15 and is secured to the web 11 at the opposite sides of the slot by weld joints, as indicated at 17 and 18, extending longitudinally of the tube.

An externally screw threaded shaft or screw 20 extends through the tube 16 and nuts 21 and 22 are threaded onto the screw one at each end of the tube. The tube 16 is a length of stock tubing of the proper diameter and wall thickness and constitutes a sleeve receiving the shaft 20, and the screw 20 and nuts 21 and 22 may also be standard structural or machine parts.

A saddle 24 is mounted on the end of the screw 20 remote from the opening 14 and comprises a section cut out of a piece of tubing having an inside diameter substantially equal to the outside diameter of the pipe or tubing to be carried on the pipe support. This saddle is mounted adjacent its mid-length location on the screw 20 by a weld joint 25 and has its concave side facing away from the screw to receive the pipe to be supported thereon.

In the arrangement shown in Figures 1 to 4 inclusive, the support is provided with a base, generally indicated at 30, including a base plate 31 of elongated, rectangular shape extending across the end of the standard 10 remote from the screw 20 and disposed perpendicular to and symmetrically of the longitudinal center line of the standard, and triangular webs 32 and 33 disposed one at each side of the standard and extending from the outwardly projecting end portions of the base plate 31 to the outer surfaces of the flanges 12 and 13 of the standard substantially in the plane of the standard web 11.

The webs or gussets 32 and 33 are notched in their edges adjacent the base plate 31, as indicated at 34 and 35, and the base plate is provided with apertures 36 and 37 in alignment with the notches 34 and 35 respectively, to receive holddown bolts for connecting the base 30 to a member of a building or other structure. The heads of the bolts or the nuts threaded onto the bolts are received in the notches 34 and 35, these notches permitting the bolts to be centered relative to the width of the base plate 31.

The screw 20 extends into the opening 14 in the web 11 and the nut 22 threaded onto the screw at the corresponding end of the tube 16 is also disposed in the opening 14, this opening being of sufficient width to permit rotation of the nut by a suitable wrench.

In the arrangement illustrated in Figure 5, a foundation block 40 of concrete or other suitable material is disposed in a hole in the ground and a base 41 is mounted in vertically disposed position in this concrete block.

The base 41 comprises an I-beam section of the same size as the I-beam section constituting the standard 10 and has a flat web 42 and flanges 43 and 44 extending one along each side edge of the web in spaced apart and parallel relationship to each other and extending to opposite sides of the web. The I-beam section 41 has its upper end substantially flush with the top end of the foundation block 40 and plates 45 and 46 are secured one to each side of the web 42 adjacent the upper end of the I-beam section 41 and project above the top end of the I-beam and the foundation block 40 in spaced apart and substantially parallel relationship to each other. The standard 10 is disposed with its flanges 12 and 13 resting at their bottom ends on the upper ends of the flanges 43 and 44 of the base section 41 and with its web received between the plates 45 and 46 and secured thereto by the weld joints 47 and 48.

The base illustrated in Figures 1 to 4 inclusive is particularly adapted for supporting pipes in plants, such as chemical plants and refineries, and the base illustrated in Figures 5 and 6 is particularly adapted for supporting the pipes of cross country gas transmission lines and other pipes supported directly from the ground.

After the pipe supports have been set up at the proper locations along a pipeline, the saddles may be adjusted up and down to proper levels as determined by the surveying instruments or other means, and the nuts 21 and 22 then tightened against the corresponding ends of the tube sections 16 to hold the saddles at the proper levels and in proper position to receive the pipes of the pipeline. The bearing surfaces of the saddles and the surfaces of the pipes are painted before the pipes are placed on the supports and, when it is necessary to repaint the structure, each saddle can be lowered while the pipe is blocked up at opposite sides thereof, so that the bearing surface of the saddle and the corresponding under surface of the pipe can be repainted and the saddle can then be reset to support the pipe in proper position.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A pipe support comprising a standard including a flat web provided with an opening intermediate the length of the standard and a slot extending medially thereof from said opening to one end of said standard and reinforcing flanges extending along each longitudinal edge of said web, a tube coterminously disposed in said slot and secured to said web, a screw extending through said tube, nuts threaded onto said screw one at each end of said tube, a pipe engaging saddle mounted on said screw at the end of the latter remote from the opening in said web, and a supporting base secured to said standard at the end of the latter remote from said tube.

2. An adjustable pipe support comprising an upright standard, means secured to said standard providing a vertically disposed sleeve having its upper end substantially flush with the upper end of said standard, a shaft extending through said sleeve, means supporting said shaft in selected positions of longitudinal adjustment relative to said sleeve, a pipe engaging saddle secured on the upper end of said shaft, and a supporting base secured to said standard at the lower end of the latter, said standard including a flat web and flanges extending one along each longitudinal edge of said web in spaced apart and substantially parallel relationship to each other and said supporting base comprising a base plate extending transversely of the lower end of said standard substantially perpendicular to and symmetrically of the longitudinal center line of the standard with its end portions projecting beyond said flanges, and webs extending one along each of said flanges and along the corresponding end portions of said base plate and disposed substantially in the plane of said web.

3. An adjustable pipe support comprising an upright standard, means secured to said standard providing a vertically disposed sleeve having its upper end substantially flush with the upper end of said standard, a shaft extending through said sleeve, means supporting said shaft in selected positions of longitudinal adjustment relative to said sleeve, a pipe engaging saddle secured on the upper end of said shaft, and a supporting base secured to said standard at the lower end of the latter, said standard including a flat web and flanges extending one along each longitudinal edge of said web in spaced apart and substantially parallel relationship to each other and said supporting base comprising a base plate extending transversely of the lower end of said standard substantially perpendicular to and symmetrically of the longitudinal center line of the standard with its end portions projecting beyond said flanges, and webs extending one along each of said flanges and along the corresponding end portions of said base plates and disposed substantially in the plane of said web and having notches in their edges adjacent said base plate, said base plate having apertures therein in alignment with the notches in said webs for receiving hold-down bolts.

4. An adjustable pipe support comprising an upright standard, means secured to said standard providing a vertically disposed sleeve having its upper end substantially flush with the upper end of said standard, a shaft extending through said sleeve, means supporting said shaft in selected positions of longitudinal adjustment relative to said sleeve, a pipe engaging saddle secured on the upper end of said shaft, and a supporting base secured to said standard at the lower end of the latter, said standard including a flat web and flanges extending one along each longitudinal edge of said web in spaced apart and substantially parallel relationship to each other and said supporting base comprising a foundation block, a section embedded in said block with its upper end substantially flush with the upper surface of the block and including a flat web and flanges extending one along each longitudinal edge of the web, and plates secured to the web of said section one at each side of the latter and projecting above the upper end of said foundation block in spaced apart and substantially parallel relationship to each other, said standard being disposed on the upper end of said section with the lower ends of its flanges resting on the upper ends of the flanges of said section and its web disposed between and secured to said plates.

References Cited in the file of this patent

UNITED STATES PATENTS

| Number | Name | Date |
|---|---|---|
| 348,690 | Regester | Sept. 7, 1886 |
| 399,926 | Pollard | Mar. 19, 1889 |
| 675,104 | Oberle | May 28, 1901 |
| 1,343,279 | Reynolds | June 15, 1920 |
| 1,709,898 | Cunneen | Apr. 23, 1929 |
| 2,532,168 | Jakoubek | Nov. 28, 1950 |